(12) United States Patent
Choe

(10) Patent No.: US 8,373,740 B2
(45) Date of Patent: Feb. 12, 2013

(54) METHOD AND APPARATUS FOR VIDEO CONFERENCING IN MOBILE TERMINAL

(75) Inventor: Ji Hwan Choe, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1097 days.

(21) Appl. No.: 12/332,862

(22) Filed: Dec. 11, 2008

(65) Prior Publication Data

US 2009/0154571 A1 Jun. 18, 2009

(30) Foreign Application Priority Data

Dec. 14, 2007 (KR) .................. 10-2007-0131045

(51) Int. Cl.
*H04N 7/14* (2006.01)

(52) U.S. Cl. ............... 348/14.02; 348/14.01; 348/14.08; 348/14.12

(58) Field of Classification Search .... 348/14.01–14.16; 715/753
See application file for complete search history.

(56) References Cited

U.S. PATENT DOCUMENTS

| | | | | |
|---|---|---|---|---|
| 2002/0093531 A1* | 7/2002 | Barile | ........................... | 345/753 |
| 2006/0132596 A1* | 6/2006 | Ahonen | ..................... | 348/14.09 |
| 2008/0119242 A1* | 5/2008 | Cho | .............................. | 455/574 |

FOREIGN PATENT DOCUMENTS

| | | |
|---|---|---|
| KR | 10-0602704 B1 | 7/2006 |
| KR | 10-0735415 B1 | 7/2007 |

* cited by examiner

*Primary Examiner* — Melur Ramakrishnaiah
(74) *Attorney, Agent, or Firm* — Jefferson IP Law, LLP

(57) ABSTRACT

A method and apparatus for video conferencing in a mobile terminal are disclosed. The method includes receiving audio-visual signals comprising a video signal and a voice signal from participating users, selecting one of the audio-visual signals associated with a currently talking user based on properties of the audio-visual signals, decoding all frames of a video signal from the selected audio-visual signal and selectively decoding frames of video signals of the remaining audio-visual signals, and reproducing the decoded frames of the video signals.

18 Claims, 5 Drawing Sheets

METHOD AND APPARATUS FOR VIDEO CONFERENCING IN MOBILE TERMINAL

PRIORITY

This application claims the benefit under 35 U.S.C. §119 (a) of a Korean patent application filed in the Korean Intellectual Property Office on Dec. 14, 2007 and assigned Serial No. 10-2007-0131045, the entire disclosure of which is hereby incorporated by reference.

BACKGROUND OF THE INVENTION

1. Field of the Invention

The present invention relates to a mobile terminal. More particularly, the present invention relates to a method and apparatus for video conferencing in a mobile terminal wherein signal reproduction is carried out with priority given to a currently talking user.

2. Description of the Related Art

Video-enabled terminals are generally used to perform audio and visual communication by transmitting and receiving images and voices through video and audio channels. Video telephony enables users of camera-equipped video terminals to see each other during phone conversations. Video telephony services may be provided through circuit-switching based on exchangers or through packet-switching over All-Internet Protocol (IP) networks. A video telephony service on a mobile communication network must be implemented according to the H.323, H.324 or H.324M recommendation from the International Telecommunications Union (ITU). H.323 is a system protocol for providing a video telephony service on a packet data network such as an IP-based network. H.324 is a system protocol for voice, video and data transmission over a public network and H.324M (Mobile) is a version of H.324 adapted for mobile communication.

When a video conference is performed using video-enabled mobile terminals, each mobile terminal receives a voice signal and an image signal from multiple conference participants.

Since a mobile terminal is a terminal to be carried by the user, a size limitation exists for the mobile terminal. As a result, the size limitation of the mobile terminal places a limit on resources equipped in the mobile terminal, including a central processing unit and memory. Hence, reproducing the voice signal and image signal from the multiple conference participants may impose a heavy burden on resource usage of the mobile terminal.

Therefore, a need exists for a system and method for limiting resource usage of a mobile terminal during video conferencing.

SUMMARY OF THE INVENTION

An aspect of the present invention is to address the above-mentioned problems and/or disadvantages and to provide at least the advantages described below. Accordingly, an aspect of the present invention is to provide a method and apparatus for video conferencing in a mobile terminal wherein reproduction of video signals during video conferencing by multiple participants is carried out with priority given to the currently talking speaker. In addition, the present invention provides a method and apparatus for video conferencing in a mobile terminal wherein limited resources of the mobile terminal are effectively utilized.

In accordance with an aspect of the present invention, a method of video conferencing by multiple participating users using a mobile terminal is provided. This method includes receiving audio-visual signals comprising a video signal and voice signal from the participating users, selecting one of the audio-visual signals associated with a currently talking user based on properties of the audio-visual signals, decoding all frames of a video signal from the selected audio-visual signal, and selectively decoding frames of video signals from remaining audio-visual signals and reproducing the decoded frames of the video signals.

In the selecting of one of the audio-visual signals, the audio-visual signal comprising an audio signal with the highest sound level may be selected.

Alternatively, the audio-visual signal comprising at least one of an audio signal and a video signal with the highest bit rate may be selected.

Alternatively, the audio-visual signal that requires a greatest amount of resources to process in the mobile terminal may be selected. The amount of resources may correspond to at least one of memory requirements and processing requirements to process an audio-visual signal.

The selectively decoding of frames from the video signals may comprise at least one of decoding only I-frames of a video signal and skipping decoding of a video signal.

In accordance with another aspect of the present invention, an apparatus for video conferencing by multiple participating users in a mobile terminal is provided. This apparatus includes a radio communication unit for receiving audio-visual signals comprising a video signal and voice signal from the participating users, a control unit for selecting one of the audio-visual signals associated with a currently talking user based on properties of the audio-visual signals, decoding all frames of a video signal of the selected audio-visual signal and selectively decoding frames of video signals from remaining audio-visual signals, and a display unit for reproducing the decoded frames of the video signals.

The control unit may selectively decode frames of video signals by at least one of decoding only I-frames of a video signal and skipping decoding of video signals.

The control unit may select one of the audio-visual signals comprising an audio signal with the highest sound level as an audio-visual signal associated with the currently talking user.

Alternatively, the control unit may select one of the audio-visual signals comprising at least one of an audio signal and a video signal with the highest bit rate as an audio-visual signal associated with the currently talking user.

Alternatively, the control unit may select one of the audio-visual signals that requires a greatest amount of resources to process in the mobile terminal as an audio-visual signal associated with the currently talking user. The amount of resources may correspond to at least one of memory requirements and processing requirements to process an audio-visual signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the purpose of description, a mobile communication terminal capable of video telephony is described as an example of a mobile terminal of the present invention. However, the present invention is not limited thereto. The mobile terminal, according to exemplary embodiments of the present invention, is a terminal capable of video telephony and may be any information and communication appliance or multimedia appliance, such as a mobile communication terminal, mobile phone, personal digital assistant, smart phone, International Mobile Telecommunications 2000 (IMT 2000) terminal, Universal Mobile Telecommunications System (UMTS) terminal, notebook or personal computer, and the like.

Figure 1:
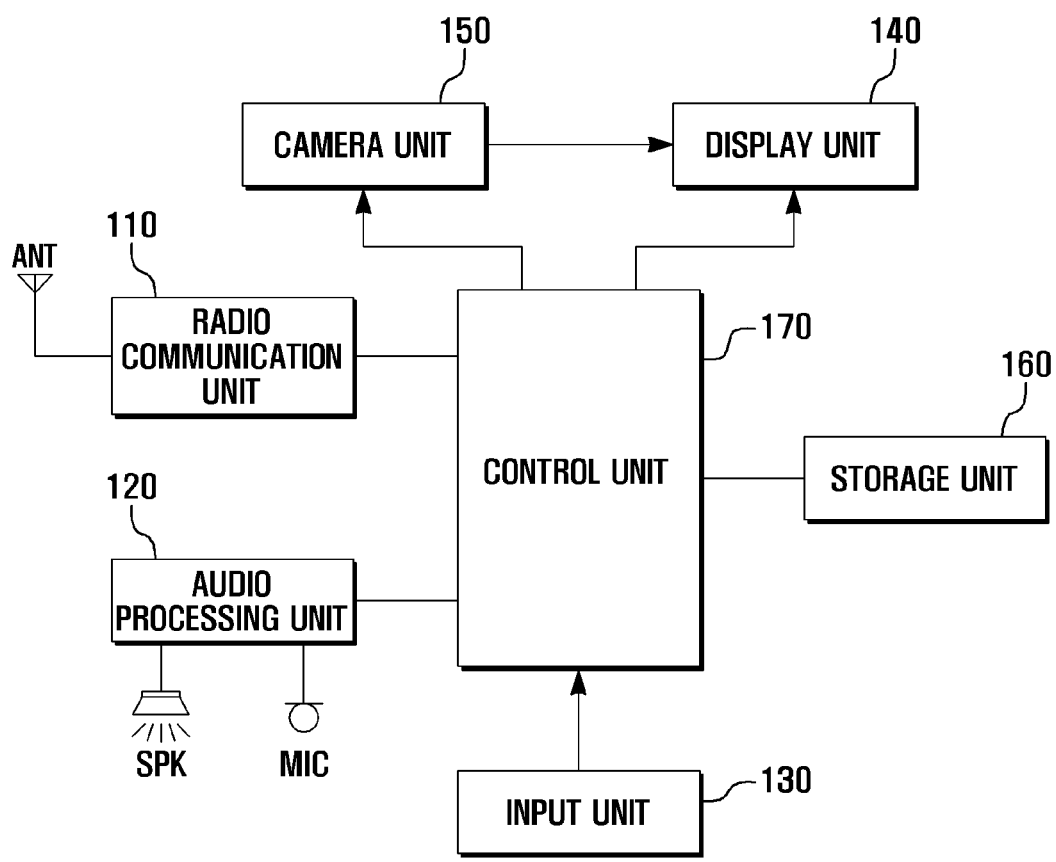
FIG. 1 is a block diagram illustrating a mobile terminal according to an exemplary embodiment of the present invention.

FIG. 1 is a block diagram illustrating a mobile terminal according to an exemplary embodiment of the present invention.

Referring to FIG. 1, the video-enabled mobile terminal comprises a radio communication unit 110, an audio processing unit 120, an input unit 130, a display unit 140, a camera unit 150, a storage unit 160 and a control unit 170.

The radio communication unit 110 performs operations related to radio transmission and reception for a video call. The radio communication unit 110 may comprise a Radio Frequency (RF) transmitter for upconverting the frequency of a signal carrying a video call bit stream and amplifying the signal for transmission. Further, the radio communication unit 110 may comprise an RF receiver for low-noise amplifying a received signal carrying a video call bit stream and downconverting the frequency of the received signal.

The audio processing unit 120 reproduces an audio stream from the control unit 170 through a speaker SPK. Further, the audio processing unit 120 converts an analog signal such as a voice signal or an acoustic signal from a microphone MIC into a digital signal and sends the digital signal to the control unit 170.

The input unit 130 comprises a plurality of alphanumeric and function keys for inputting alphanumeric information and for setting various functions. The input unit 130 transmits key signals from the user for setting and controlling the mobile terminal to the control unit 170.

The display unit 140 displays images from the camera unit 150 on a screen and displays a video stream from the control unit 170. The display unit 140 displays menus and function settings of the mobile terminal, information input by the user and information to be provided to the user. The display unit 140 may comprise a panel of Liquid Crystal Display (LCD) devices. If the panel comprises touch screen capability, the display unit 140 can perform the function of the input unit 130 in part or in whole.

The camera unit 150 provides a photographing function of the mobile terminal. The camera unit 150 comprises a camera module (not shown), a signal processor (not shown), and an image processor (not shown). The camera module comprises a lens for forming an image of a target object and a camera sensor for converting an optical video signal corresponding to the formed image into an electrical video signal. In an exemplary embodiment of the present invention, the camera sensor is a Charge-Coupled Device (CCD) sensor. The signal processor converts the analog video signal from the camera sensor into a digital video signal. The signal processor is implemented using a Digital Signal Processor (DSP), according to an exemplary embodiment of the present invention. The image processor generates screen data to display a video signal from the signal processor and outputs screen video data compliant with specifications of the display unit 140 under the control of the control unit 170.

The storage unit 160 stores application programs and associated data necessary for the operation of the mobile terminal. The storage unit 160 may comprise one or more buffers to temporarily store data generated from execution of application programs. The storage unit 160 may comprise a program storage section and a data storage section. The program storage section stores an Operating System (OS) for booting the mobile terminal and application programs for supplementary functions. The data storage section stores data generated from the utilization of the mobile terminal.

The control unit 170 controls the overall operation of the mobile terminal and signal exchange between internal elements thereof. Specifically, the control unit 170 controls signal exchange between the audio processing unit 120, input unit 130, display unit 140, camera unit 150 and storage unit 160.

The control unit 170 may comprise a codec, a modem and a multiplexer/demultiplexer. The codec encodes an audio-visual signal comprising a video signal and voice signal for transmission. The codec also decodes a received coded audio-visual signal comprising a video signal and voice signal. In particular, a received audio-visual signal comprising a video signal and voice signal, the control unit 170 controls the codec to change the decoding scheme of the video signal according to at least one of a sound level of the voice signal, a bit rate of at least one of the video signal and voice signal or an amount of resources used to reproduce the received audio-visual signal. For example, the control unit 170 may decode all of the I, B and P frames of a video signal or decode only the I frames of the video signal.

The multiplexer/demultiplexer multiplexes a coded video signal and voice signal for transmission and demultiplexes a received signal comprising the multiplexed video signal and voice signal. The modem modulates a multiplexed audio-visual signal for transmission and demodulates a modulated audio-visual signal received by the radio communication unit 110. The codec, modem and multiplexer/demultiplexer may be included in the radio communication unit 110 or may be implemented as a separate entity between the radio communication unit 110 and control unit 170.

The control unit 170 provides end-to-end signaling for appropriate operation of the mobile terminal. For example, the control unit 170 sends a video call setup message through a control channel and provides messages to open and represent logical channels.

In an exemplary embodiment of the present invention, although not shown, the mobile terminal may further comprise any one of a storage media connector to connect to an external storage medium, such as a memory card for storing data, a connection terminal for exchanging data with an external digital appliance and a charge terminal. The mobile terminal may further comprise supplementary units, such as a broadcast receiving module to receive digital broadcasts and an MP3 module to play back digital audio materials.

With a digital convergence trend, it should be apparent to those skilled in the art that the mobile terminal may further comprise units comparable to the above-described units, according to an exemplary embodiment of the present invention.

In an exemplary embodiment of the present invention, a method of video conferencing is described below with an assumption that four participants, including the user of the mobile terminal, take part in a video conference using the above-described mobile terminal. To distinguish the participants, the participants are referred to as first to fourth users with an assumption that the first user is the user of the mobile terminal, according to an exemplary embodiment of the present invention. In addition, an audio-visual signal carries a bit stream and comprises a video signal and voice signal. The video signal carries a video image captured by the camera unit 150 and the voice signal is a signal input through a microphone. The terminal of a user sends and receives an audio-visual signal comprising a video signal and voice signal.

In particular, a video signal comprises multiple image frames and a video screen is formed by displaying a number of frames within a preset time duration. Video data is encoded using three types of frames: I (intra), P (previous or predicted) and B (bidirectional). For example, a sequence of frames can be I, B, B, P, B, B, P, (B, B,) I, B, B, P . . . . An I-frame is directly encoded from a source image captured by the camera unit 150 and is larger than a B-frame or P-frame. A P-frame comprises information on a screen change relative to an I-frame before the P-frame and is smaller than an I-frame. A B-frame comprises information on a screen change relative to an I-frame and P-frame before and after the P-frame and is smaller than an I-frame or P-frame.

In an exemplary embodiment of the present invention, the mobile terminal reproduces a video signal from the active user by decoding all of the I, B and P-frames (full decoding), reproduces video signals from the inactive users by decoding only the I-frames or does not reproduce some video signals from the inactive users. As a result, video signals are reproduced with priority given to a currently talking (active) user in a video conference and limited resources are saved.

Figure 2A:
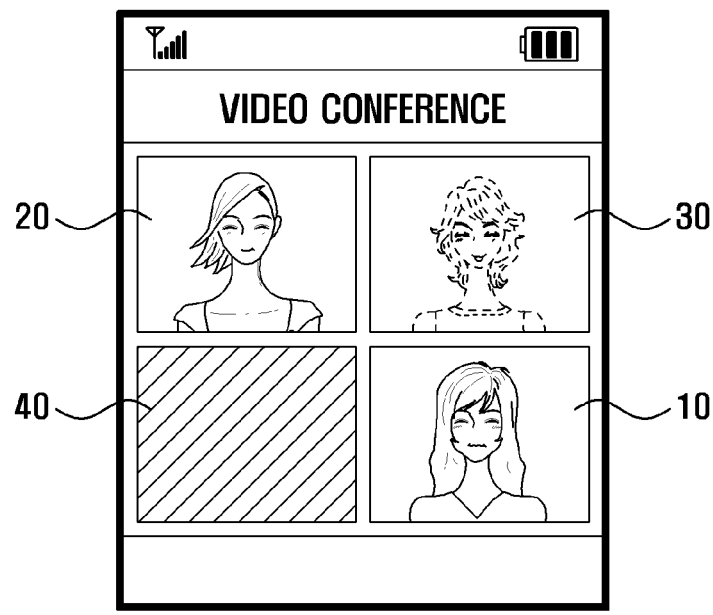
FIGS. 2A and 2B are screen representations depicting a video conference.
Figure 2B:

In addition, screen windows are configured so that inactive users may concentrate their attention on a currently active user. FIGS. 2A and 2B are screen representations depicting a video conference.

In FIGS. 2A and 2B, reference numerals 10, 20, 30 and 40 denote the windows of the first to fourth users, respectively, with an assumption that the first user is the user carrying an exemplary mobile terminal of the present invention, and the second user is currently talking.

The video signal from the second user is displayed through full decoding on the window 20, the video signal from the third user is displayed only through I-frame decoding on the window 30 and the video signal from the fourth user is not displayed on the window 40.

As shown in FIG. 2A, video signals from all of the users may be displayed on equal-sized windows. As shown in FIG. 2B, the video signal from the active user (fully decoded) may be displayed on a large window and other video signals may be displayed on small windows.

Figure 3:
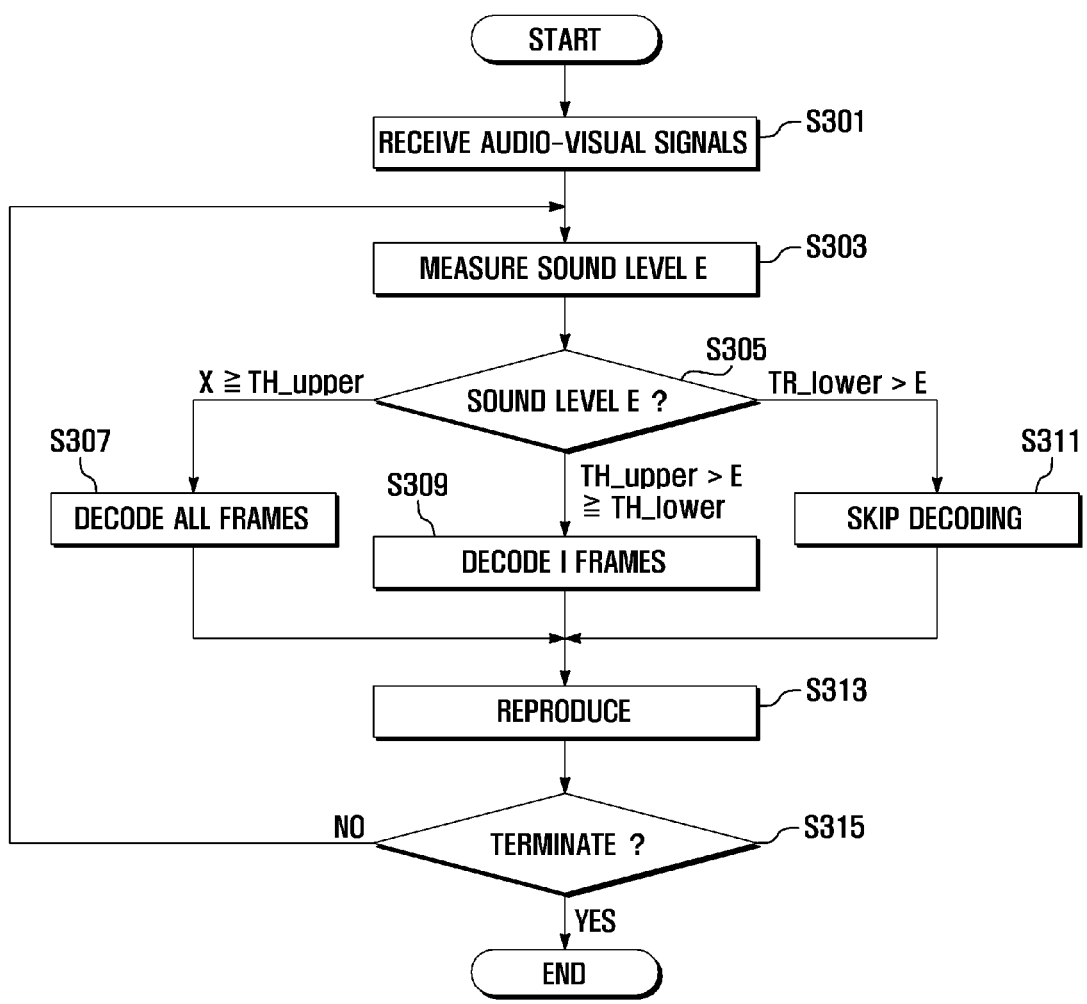
FIG. 3 is a flowchart illustrating a method of video conferencing according to an exemplary embodiment of the present invention.

FIG. 3 is a flowchart illustrating a method of video conferencing according to an exemplary embodiment of the present invention.

Referring to FIG. 3, the control unit 170 receives multiple audio-visual signals carrying a video signal and voice signal from all of the users through the radio communication unit 110 in step S301.

The control unit 170 measures the sound level of a voice signal in a received audio-visual signal associated with a selected user in step S303.

The control unit 170 compares the measured sound level with preset thresholds to determine the decoding scheme of the video signal associated with the selected user in step S305. Thereto, a first threshold TH_upper and second threshold TH_lower are set. Here, the first threshold TH_upper is higher than the second threshold TH_lower. When the sound level of a received voice signal is denoted by E, the following three cases can be derived from the sound level E and the first threshold and second threshold, as in Equation 1.

$$E \geq \text{TH\_upper},$$
$$\text{TH\_upper} > E \geq \text{TH\_lower},$$
$$\text{TH\_lower} > E \qquad \text{[Equation 1]}$$

For example, the sound level E of a voice signal can be higher than or equal to the first threshold ($E \geq \text{TH\_upper}$), lower than the first threshold and higher than or equal to the second threshold ($\text{TH\_upper} > E \geq \text{TH\_lower}$) or lower than the second threshold ($\text{TH\_lower} > E$).

If the measured sound level E is higher than or equal to the first threshold ($E \geq \text{TH\_upper}$), the control unit 170 decodes all of the video signal frames associated with the selected user in step S307. That is, all of the I, B and P frames are decoded.

If the measured sound level E is lower than the first threshold and higher than or equal to the second threshold ($\text{TH\_upper} > E \geq \text{TH\_lower}$), the control unit 170 decodes only the I-frames of the video signal associated with the selected user in step S309.

If the measured sound level E is lower than the second threshold ($\text{TH\_lower} > E$), the control unit 170 skips decoding of the video signal associated with the selected user in step S311.

Accordingly, the resources of the mobile terminal are effectively utilized by decoding video signals with priority given to the currently talking user in a video conference. In a video conference, multiple users rarely talk at the same time and only the user holding the floor talks in most cases. Users other than the currently talking user are expected to concentrate their attention on the currently talking user holding the floor. As a result, the voice signal from the user currently holding the floor comprises a high sound level. Hence, the video signal related to a voice signal with a high sound level is fully decoded. The video signal related to a voice signal with a low sound level is partially decoded (I-frames) or is not decoded. As a result, the limited resources of the mobile terminal can be saved.

Thereafter, the control unit 170 reproduces the decoded video frames and the decoded voice signal of the selected user in step S313. At this time, the voice signal is output to a speaker SPK through the audio processing unit 120 and the video signal is displayed on the display unit 140. A display of the video signals is illustrated in FIGS. 2A and 2B.

In FIGS. 2A and 2B, reference numerals 10, 20, 30 and 40 denote the windows of the first to fourth users, respectively. An assumption is made that the sound level E associated with the second user is higher than or equal to the first threshold (E≧TH_upper), the sound level E associated with the third user is lower than the first threshold and higher than or equal to the second threshold (TH_upper>E≧TH_lower) and the sound level E associated with the fourth user is lower than the second threshold (TH_lower>E).

Hence, the video signal from the second user is displayed as a whole moving image on the window 20 through full decoding. The video signal from the third user is displayed on the window 30 only through I-frame decoding. The video signal from the fourth user is not decoded and not displayed on the window 40. In this case, a pre-stored still image for the fourth user may be displayed on the window 40. In an exemplary embodiment of the present invention, the window 10 for the first user, who carries an exemplary mobile terminal according to the present embodiment may be closed or opened according to the first user's selection.

During the video conference, the control unit 170 determines whether a termination request for the video conference is made in step S315. If a termination request is not made, the control unit 170 returns to step S303 to measure the sound level associated with another selected user. As a result, when a new user starts to talk, the video signal from a newly talking user is fully decoded. If a termination request is made, the control unit 170 ends the procedure.

In addition to sound level, similar selective decoding may be performed. For Example, selective decoding may be performed based on the bit rate of at least one of a video signal and voice signal.

During communication, which employs variable bit rates, the voice signal from the talking user is expected to comprise a high sound level and a high bit rate. Additionally, the video signal from the talking user comprises a high bit rate when the user makes a gesture.

Figure 4:
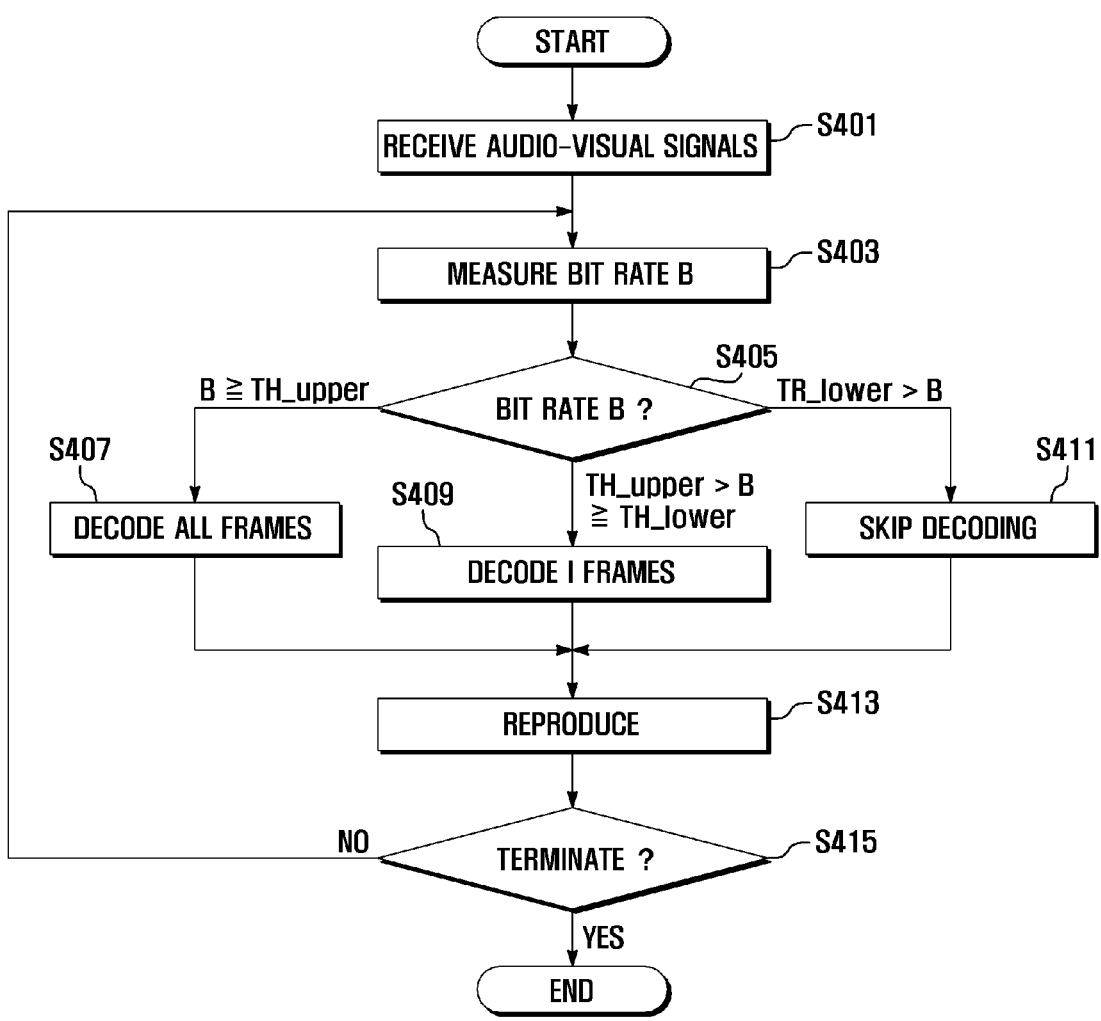
FIG. 4 is a flowchart illustrating a method of video conferencing according to an exemplary embodiment of the present invention.

FIG. 4 is a flowchart illustrating a method of video conferencing according to an exemplary embodiment of the present invention.

Referring to FIG. 4, the control unit 170 receives multiple audio-visual signals carrying a video signal and voice signal from all of the users through the radio communication unit 110 in step S401. The control unit 170 determines the bit rate of a voice signal in a received audio-visual signal associated with a selected user in step S403.

The control unit 170 compares the bit rate with preset thresholds to determine the decoding scheme of the video signal associated with the selected user in step S405. Accordingly, a first threshold TH_upper and second threshold TH_lower are set. Here, the first threshold TH_upper is higher than the second threshold TH_lower. When the bit rate of a received voice signal is denoted by B, the following three cases can be derived from the bit rate B and the first threshold and second threshold, as in Equation 2.

$$B \geq TH\_upper,$$

$$TH\_upper > B \geq TH\_lower,$$

$$TH\_lower > B \qquad \text{[Equation 2]}$$

For example, the bit rate B of a voice signal may be higher than or equal to the first threshold (B≧TH_upper), lower than the first threshold and higher than or equal to the second threshold (TH_upper>B≧TH_lower) or lower than the second threshold (TH_lower>B).

If the bit rate B is higher than or equal to the first threshold (B≧TH_upper), the control unit 170 decodes all of the frames of the video signal associated with the selected user in step S407.

If the bit rate B is lower than the first threshold and higher than or equal to the second threshold (TH_upper>B≧TH_lower), the control unit 170 decodes only the I-frames of the video signal associated with the selected user in step S409.

If the bit rate B is lower than the first threshold and higher than or equal to the second threshold (TH_upper>B≧TH_lower), the control unit 170 decodes only the I-frames of the video signal associated with the selected user in step S409.

If the bit rate B is lower than the second threshold (TH_lower>B), the control unit 170 skips decoding of the video signal associated with the selected user in step S411.

Thereafter, the control unit 170 reproduces the decoded video frames and the decoded voice signal of the selected user in step S413. At this time, the voice signal is output to a speaker SPK through the audio processing unit 120 and the video signal is displayed on the display unit 140. A display of the video signals is illustrated in FIGS. 2A and 2B.

In FIGS. 2A and 2B, reference numerals 10, 20, 30 and 40 denote the windows of the first to fourth users, respectively. An assumption is made that the bit rate B associated with the second user is higher than or equal to the first threshold (B≧TH_upper), the bit rate B associated with the third user is lower than the first threshold and higher than or equal to the second threshold (TH_upper>B≧TH_lower), and the bit rate B associated with the fourth user is lower than the second threshold (TH_lower>B).

Hence, the video signal from the second user is displayed as a whole moving image on the window 20 through full decoding. The video signal from the third user is displayed on the window 30 only through I-frame decoding. The video signal from the fourth user is not decoded and is not displayed on the window 40.

During the video conference, the control unit 170 determines whether a termination request for the video conference is made in step S415. If a termination request is not made, the control unit 170 returns to step S403 to determine the bit rate associated with another selected user. As a result, when a new user starts to talk, the video signal from the newly talking user is fully decoded. If a termination request is made, the control unit 170 ends the procedure. Hereinabove, selective decoding of a video signal is performed based on the bit rate of a related voice signal. Selective decoding of a video signal may also be performed based on the bit rate of the video signal.

Figure 5:
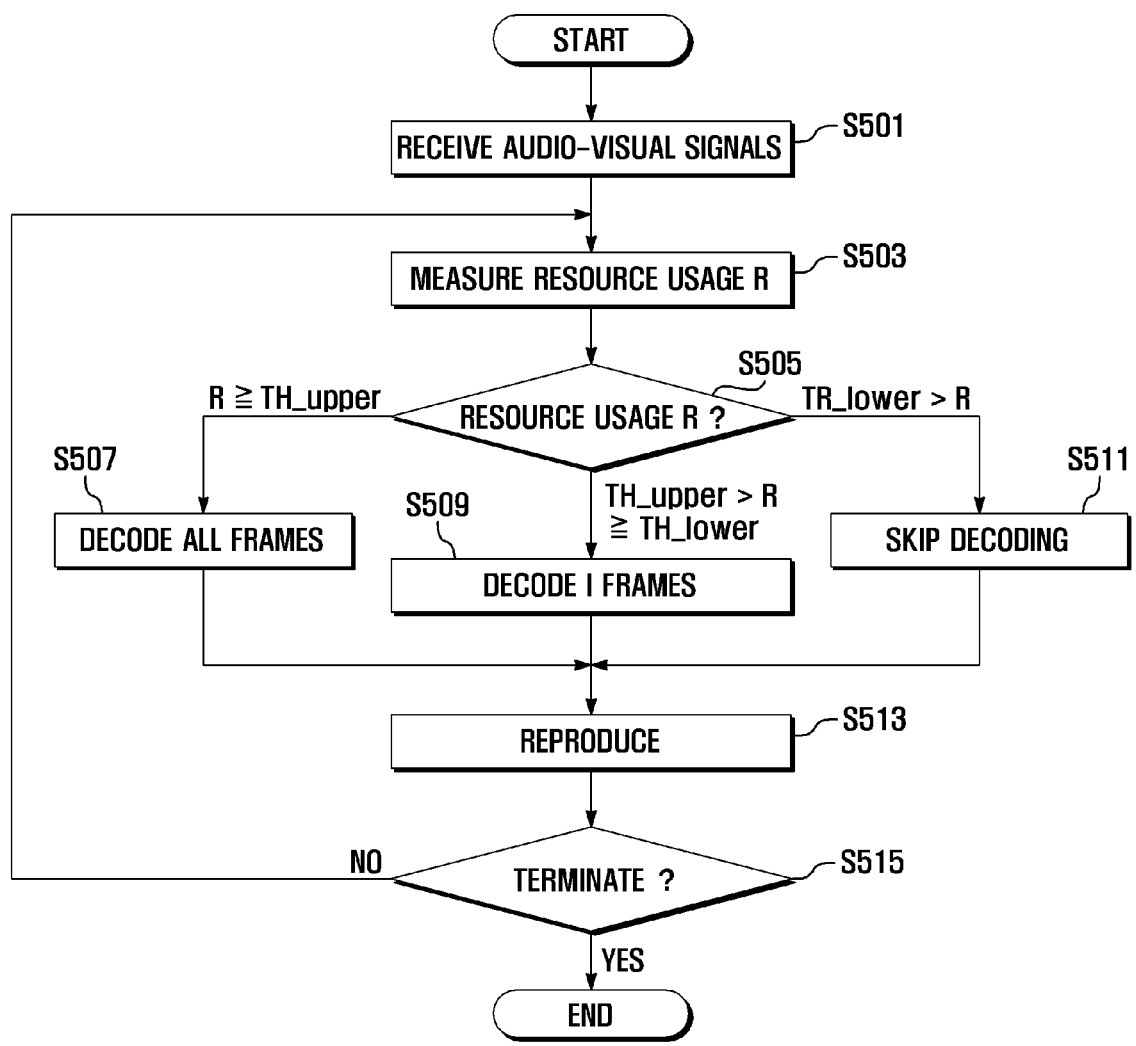
FIG. 5 is a flowchart illustrating a method of video conferencing according to an exemplary embodiment of the present invention.

The audio-visual signal from the currently talking user is expected to require a large amount of resources of the mobile terminal. The resources are related to the memory capacity and load on the control unit to process an audio-visual signal. FIG. 5 is a flowchart illustrating a method of video conferencing according to an exemplary embodiment of the present invention.

Referring to FIG. 5, the control unit 170 receives multiple audio-visual signals carrying a video signal and voice signal from all of the users through the radio communication unit 110 in step S501. The control unit 170 determines the resource usage to process a received audio-visual signal associated with a selected user in step S503.

The control unit 170 compares the resource usage with preset thresholds to determine the decoding scheme of the video signal associated with the selected user in step S505. As a result, a first threshold TH_upper and second threshold TH_lower are set. Here, the first threshold TH_upper is higher than the second threshold TH_lower. When the resource usage to process an audio-visual signal carrying a video signal and voice signal is denoted by R, the following three cases can be derived from the resource usage R and the first threshold and second threshold, as in Equation 3.

$$R \geq TH\_upper,$$
$$TH\_upper > R \geq TH\_lower,$$
$$TH\_lower > R \qquad \text{[Equation 3]}$$

For example, the resource usage R may be greater than or equal to the first threshold ($R \geq TH\_upper$), less than the first threshold and greater than or equal to the second threshold ($TH\_upper > R \geq TH\_lower$) or less than the second threshold ($TH\_lower > R$).

If the resource usage R is greater than or equal to the first threshold ($R \geq TH\_upper$), the control unit 170 decodes all of the frames of the video signal associated with the selected user in step S507.

If the resource usage R is less than the first threshold and greater than or equal to the second threshold ($TH\_upper > R \geq TH\_lower$), the control unit 170 decodes only the I-frames of the video signal associated with the selected user in step S509.

If the resource usage R is less than the second threshold ($TH\_lower > R$), the control unit 170 skips decoding of the video signal associated with the selected user in step S511.

Thereafter, the control unit 170 reproduces the decoded video frames and the decoded voice signal of the selected user in step S513. At this time, the voice signal is output to a speaker SPK through the audio processing unit 120 and the video signal is displayed on the display unit 140. A display of the video signals is illustrated in FIGS. 2A and 2B.

In FIGS. 2A and 2B, reference numerals 10, 20, 30 and 40 denote the windows of the first to fourth users, respectively. An assumption is made that the resource usage R to process an audio-visual signal associated with the second user is less than or equal to the first threshold ($R \geq TH\_upper$), the resource usage R associated with the third user is less than the first threshold and greater than or equal to the second threshold ($TH\_upper > R \geq TH\_lower$) and the resource usage R associated with the fourth user is less than the second threshold ($TH\_lower > R$).

Hence, the video signal from the second user is displayed as a whole moving image on the window 20 through full decoding. The video signal from the third user is displayed on the window 30 only through I-frame decoding. The video signal from the fourth user is not decoded and is not displayed on the window 40.

During the video conference, the control unit 170 determines whether a termination request for the video conference is made in step S515. If a termination request is not made, the control unit 170 returns to step S503 to determine the resource usage associated with another selected user. As a result, the video signal from the newly talking user is fully decoded when a new user starts to talk. If a termination request is made, the control unit 170 ends the procedure.

According to exemplary embodiments of the present invention as described herein, signals from a currently talking user in a video conference are selected and reproduced, enabling other users to concentrate their attention on the talking user's words. In addition, limited resources of the mobile terminal can be saved. Hence, the use of the mobile terminal can be increased.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims and their equivalents.

What is claimed is:

1. A method for video conferencing by multiple participating users using a mobile terminal, the method comprising:
    receiving audio-visual signals comprising a video signal and a voice signal from the participating users;
    selecting one of the audio-visual signals associated with a currently talking user based on properties of the audio-visual signals;
    decoding all frames of a video signal from the selected audio-visual signal and selectively decoding frames of video signals of remaining audio-visual signals; and
    reproducing the decoded frames of the video signals.

2. The method of claim 1, wherein the selecting of the one of the audio-visual signals comprises selecting the audio-visual signal comprising an audio signal with the highest sound level.

3. The method of claim 1, further comprising comparing a sound level of the audio-visual signals with preset thresholds to determine a decoding scheme of the video signal frames.

4. The method of claim 1, wherein the selecting of the one of the audio-visual signals comprises selecting the audio-visual signal comprising at least one of an audio signal and a video signal with the highest bit rate.

5. The method of claim 1, further comprising comparing a bit rate of the audio-visual signals with preset thresholds to determine a decoding scheme of the video signal frames.

6. The method of claim 1, wherein the selecting of the one of the audio-visual signals comprises selecting the audio-visual signal which requires a greatest amount of resources to process in the mobile terminal.

7. The method of claim 1, further comprising comparing an amount of resources of the audio-visual signals with preset thresholds to determine a decoding scheme of the video signal frames.

8. The method of claim 6, wherein the amount of resources corresponds to at least one of memory requirements and processing requirements to process an audio-visual signal.

9. The method of claim 1, wherein the selectively decoding of the frames from the video signals comprises at least one of decoding only I-frames of a video signal and skipping decoding of a video signal.

10. An apparatus for video conferencing by multiple participating users in a mobile terminal, the apparatus comprising:
- a radio communication unit for receiving audio-visual signals comprising a video signal and a voice signal from the participating users;
- a control unit for selecting one of the audio-visual signals associated with a currently talking user based on properties of the audio-visual signals, decoding all frames of a video signal from the selected audio-visual signal and selectively decoding frames of video signals from remaining audio-visual signals; and
- a display unit for reproducing the decoded frames of the video signals.

11. The apparatus of claim 10, wherein the control unit selects one of the audio-visual signals comprising an audio signal with the highest sound level as an audio-visual signal associated with the currently talking user.

12. The apparatus of claim 10, wherein the control unit compares a sound level of the audio-visual signals with preset thresholds to determine a decoding scheme of the video signal frames.

13. The apparatus of claim 10, wherein the control unit selects one of the audio-visual signals comprising at least one of an audio signal and a video signal with the highest bit rate as an audio-visual signal associated with the currently talking user.

14. The apparatus of claim 10, wherein the control unit compares a bit rate of the audio-visual signals with preset thresholds to determine a decoding scheme of the video signal frames.

15. The apparatus of claim 10, wherein the control unit selects one of the audio-visual signals which require the greatest amount of resources to process in the mobile terminal as an audio-visual signal associated with the currently talking user.

16. The apparatus of claim 10, wherein the control unit compares an amount of resources of the audio-visual signals with preset thresholds to determine a decoding scheme of the video signal frames.

17. The apparatus of claim 15, wherein the amount of resources corresponds to at least one of memory requirements and processing requirements to process an audio-visual signal.

18. The apparatus of claim 10, wherein the control unit decodes only I-frames of video signals of the remaining audio-visual signals or skips decoding of video signals of the remaining audio-visual signals.

* * * * *